Aug. 7, 1962. R. J. S. BROWN 3,048,773
FLUID REMNANT MAGNETIZATION TESTER
Filed Sept. 22, 1958 2 Sheets-Sheet 1

INVENTOR
ROBERT J. S. BROWN
BY Frank E. Johnston
George W. Wasson
ATTORNEYS

Aug. 7, 1962 R. J. S. BROWN 3,048,773
FLUID REMNANT MAGNETIZATION TESTER
Filed Sept. 22, 1958 2 Sheets-Sheet 2

INVENTOR
ROBERT J. S. BROWN
BY Frank E. Johnston
George W. Wasson
ATTORNEYS

United States Patent Office 3,048,773
Patented Aug. 7, 1962

3,048,773
FLUID REMNANT MAGNETIZATION TESTER
Robert J. S. Brown, Fullerton, Calif., assignor to California Research Corporation, San Francisco, Calif., a corporation of Delaware
Filed Sept. 22, 1958, Ser. No. 762,287
9 Claims. (Cl. 324—.5)

This invention relates to a method and apparatus for determining the effect of the proximity of one substance on the intensity and duration of a nuclear magnetic signal from another substance; more particularly, the invention has application in determining whether a nuclear magnetic logging signal from the formation surrounding a well bore will be impaired by magnetic properties of the fluid within the well bore.

Methods and apparatus have been disclosed for performing nuclear magnetic relaxation measurements on spinning nuclear particles within hydrogenous fluids located in the earth strata adjacent to a well bore penetrating an earth formation. Those disclosures indicate the desirability of treating the drilling mud generally found within the well bore so that the nuclear magnetic relaxation signals derived from the formation being logged may be attributed to the precessing protons within the formation and not to the precessing protons in the drilling mud. In the past the treating or poisoning of the drilling mud has been accomplished by adding magnetic or magnetism-retentive particles to the drilling mud in quantities determined by trial and error measurements within the well bore. However, it has now been discovered that the trial and error procedure may be eliminated with the aid of a measurement method that simulates the actual process in which the magnetic material in the drilling mud affects the nuclear magnetic signal from the formation.

Commercially available drilling muds may have a variety of different characteristics determined by the constituents in the aggregate from which the mud has been mixed. Furthermore, magnetic characteristics of drilling muds are not uniform and are generally not a subject of specification when aggregates are purchased. Because of this, the magnetic characteristics of muds are usually unknown and the accurate treatment thereof for nuclear magnetism purposes by trial and error methods is difficult in that the amount of magnetic material to be added is unknown. A measure of the magnetic characteristics of the drilling mud and particularly the effect of the mud on nuclear magnetic relaxation signals from other substances would therefore be important prior to the performance of a logging operation in a well.

The present invention is directed to a simple and portable mud tester by which certain magnetic characteristics of the drilling mud may be determined at the site of a well to be logged and with a minimum amount of additional apparatus.

In view of the foregoing remarks, it is therefore an object of the present invention to provide a simple and efficient method and apparatus for determining magnetic characteristics, as above defined, of drilling muds as used in penetrating a well bore through an earth formation.

A further object of the present invention is the method of determining magnetic characteristics, as above defined, of a homogeneous mixture of finely divided particles through the use of nuclear magnetic relaxation measurements.

A further object of the present invention is a nuclear magnetic relaxation test instrument that may be adjustably oriented with respect to both the vertical and horizontal components of the earth's magnetic field and is adapted to receive a sample having known nuclear magnetic relaxation characteristics and a sample having unknown nuclear magnetic relaxation characteristics with provision for measuring the effect of the unknown sample upon the nuclear magnetic relaxation characteristics of the known sample.

Further objects and features will be readily apparent to those skilled in the art from the specification and appended drawings in which.

Figure 1:
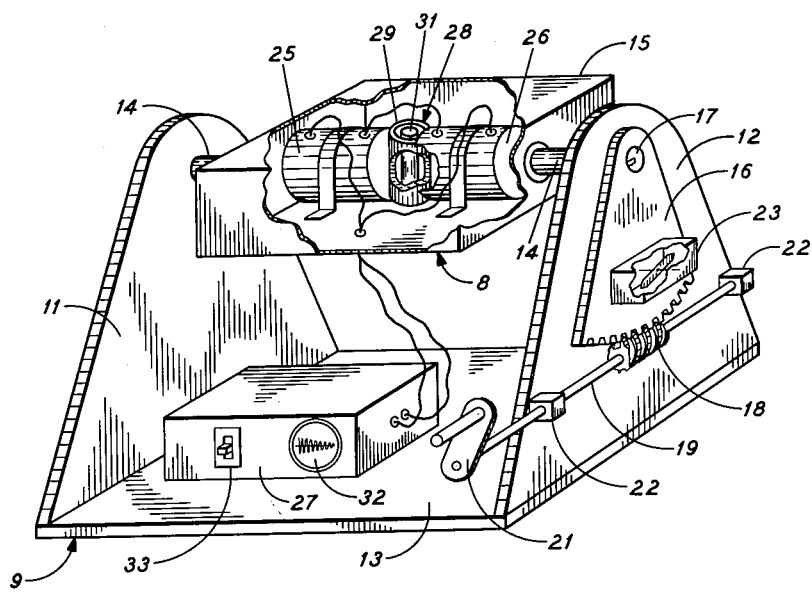
FIG. 1 illustrates one form of apparatus for the performance of the method of the present invention.
Figure 2:
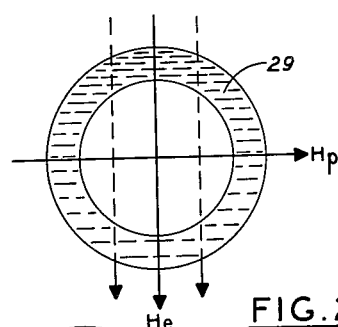
FIGS. 2 and 3 are cross-sectional drawings through the test portion of the apparatus in FIG. 1 illustrating schematically the paths of the magnetic forces employed in the performance of the present invention.
Figure 3:
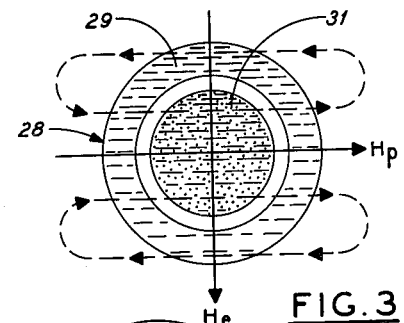
Figure 8:
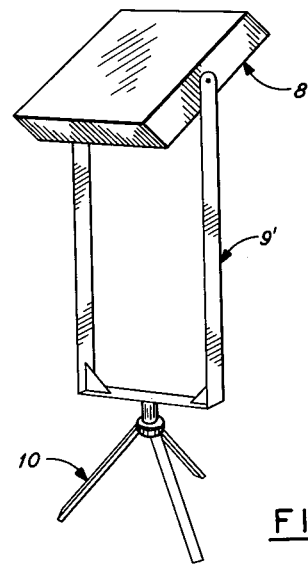
FIG. 8 is a perspective illustration of a field instrument incorporating the apparatus of the present invention.

The perspective illustration of FIG. 8 indicates the test apparatus 8 of the present invention mounted upon a frame 9' having rotational and pivotal movements and further supported on a tripod 10. Referring now to FIGS. 1 through 3 wherein a first form of apparatus is illustrated for the performance of the present invention, FIG. 1 illustrates one form that the apparatus 8 may assume, including a U-shaped frame 9 having legs 11 and 12 and a base portion 13. Both of the legs 11 and 12 are provided with bearings, not shown, for the support of a shaft 14 carrying a chassis 15. The shaft 14 and chassis 15 are rotatable about a horizontal axis through rotational movement of a sector 16 keyed to an extension 17 of the shaft 14 and driven by a worm gear 18 fixed to a rotatable shaft 19 having an external handle 21. Shaft 19 is supported on leg 12 by a pair of bearing blocks 22.

For the purposes of free precession nuclear magnetic relaxation measurements it is important that the polarization field be not parallel to the earth's magnetic field in which the protons will be precessing, and for this reason the chassis 15 or sector 16 may be provided with a magnetic dipneedle 23 of conventional design.

The chassis 15 supports a pair of coils 25 and 26 operating both as polarization coils and detector coils. During the polarization operation the coils may be energized in series from a source of supply contained within a control and display apparatus 27 supported on the base 13 of the apparatus. Also supported on the chassis 15 is a sample and test holder 28 comprising a hollow annulus 29 capable of containing a sample of known or unknown material, and a separate cylindrical space 31, in which another sample of known or unknown material may be positioned. The control and display apparatus at 27 includes a display oscilloscope 32 and a control switch 33 for the energization of the test apparatus. A camera, not herein illustrated, may be attached to the face of the oscilloscope 32, so that a permanent record may be taken from the face of the oscilloscope for comparison purposes.

Suitable switching circuits associated with switch 32 may be employed to facilitate the connection of coils for polarization of the samples and for detecting the resulting nuclear magnetism precessional signals. Appropriate circuits for that purpose are disclosed in the copending application R. J. S. Brown, and P. S. Jastram, Serial No. 725,311, filed March 31, 1958, for Switching Circuits, now Patent No. 2,998,565, issued August 29, 1961.

Figure 4:
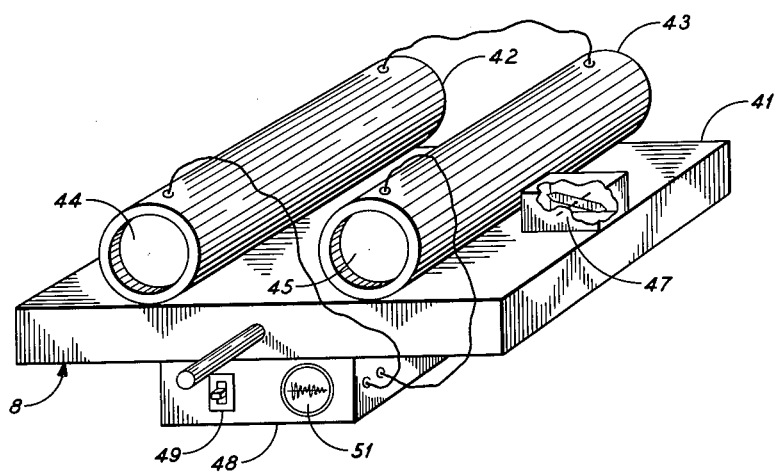
FIG. 4 is an alternative form of apparatus for the performance of the present invention.

FIG. 4 illustrates an alternative form that the apparatus may assume for the performance of the method of the present invention. In the apparatus of FIG. 4 chassis 41 is adapted to support a pair of parallel hollow solenoids 42 and 43 and provided with sample holders at 44 and 45 for the known and unknown materials. Chassis 41 may also have a compass and dipneedle at 47 that may be aligned with the earth's magnetic field to establish the proper positioning of the apparatus. Below the chassis 41 is shown a control and display panel 48 similar to that shown at 27 in FIG. 1 including a control switch 49 and an oscilloscope 51.

In that both the FIG. 1 and FIG. 4 forms are intended for use at the well site, it should be understood that the energization and display apparatus may be eliminated through the direct connection of the test apparatus to the logging apparatus intended for operation of a nuclear magnetism well logging sonde.

The theory of operation of the two alternative forms of apparatus is similar and involves sensing an apparent change in homogeneity of the earth's magnetic field employed as the precession field for the nuclear spinning particles due to the presence of extraneous magnetic fields.

Nuclear magnetism measurements may be performed by measuring the duration of free precession of polarized protons. To accomplish free precession the protons must be initially polarized to align their axis of spin with a first field of preferably uniform strength and polarity. The polarization field should be at an angle to a second field, the precessional field, or at least not parallel to the second field. After sufficient polarization has been accomplished, in the manners described in the aforementioned copending applications, the polarization field is terminated and the polarized protons are aligned at some angle to the second field which now exerts a torque on the spinning protons tending to force these protons into alignment with the second field. The protons have characteristics similar to a gyroscope, that is, angular momentum, and cannot move directly into the second field alignment, but do accomplish this movement, as the gyroscope moves into a stable position, in a manner of precession. The rate of precession is dependent upon the strength of the second field as the amount of force exerted upon a gyroscope determines the rate at which it will precess. In that the spinning protons are actually spinning electrical charges, they establish a magnetic field that is moving, in a circular or conical path, at the rate that the proton is precessing. This rotating field may be detected by inductive coupling to a coiled conductor cut by the rotating field so that a signal of the precessional movement may be detected.

The duration of a detected nuclear magnetism signal is dependent upon the homogeneity of the field in which the polarized protons are precessing. If the field is extremely homogenous and if all protons within a sample are equally polarized, the detected signal, which is the sum of a large number of individual fields forming a composite field cutting a detector coil, will be of relatively long time duration. If, on the other hand, the precessional field is inhomogenous and all polarized protons, even though equally polarized, are not precessing in the same field strength, then the precessional signal will be of shortened duration, since the precessional rates of various protons will be different and the individual rotating magnetic field will be going into and out of phase to make the composite field an algebraic sum of random fields and therefore soon becoming zero.

For the purposes of this invention, the precessional or second field is the earth's magnetic field. The earth's field is, per se, substantially uniform and homogeneous; however, when an extraneous field is superimposed upon the earth's field, as where a magnetized material is placed in the earth's field, the earth's field and the field of the magnetized material will be combined to produce an inhomogenous field in the vicinity of the magnetized material. If polarized protons are placed in proximity to this inhomogenous field and their precessional rates are measured, a detected signal of this precession will be of shorter duration than would be a detected signal if the precessional field were homogeneous. The shortening of the signal can be used as a determination of the inhomogeneity of the precessional field and by known relationships a measure of the strength and direction of the extraneous field.

Figure 7:
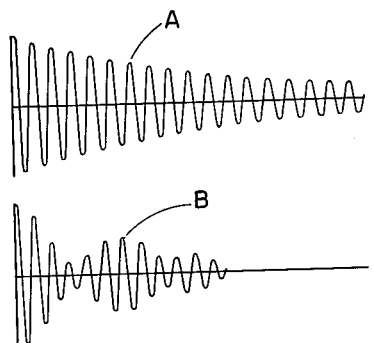
FIG. 7 is a pair of waveforms illustrating representative nuclear magnetism signals and the effect of the interaction of the unknown sample and the known sample.

Referring now to FIG. 2 wherein the earth's magnetic field is designated $H_e$ and the polarizing field from coils 25 and 26 of FIG. 1 is designated at $H_p$, the apparatus of the present invention is operated to perform a first nuclear magnetic relaxation test upon a sample of known material within the annulus 29 and without a sample present in cylinder 31. In this first test, the sample within the annulus 29 will have as its precessional field a field parallel to $H_e$ as shown in dotted lines of the figure. When the sample is a liquid, such as water, containing protons, but having no magnetic retentivity, the first nuclear magnetic precession signal will decay substantially exponentially, as illustratively shown in the upper portion of FIG. 7. On the other hand, as shown in FIG. 3, when a sample of unknown material, possibly having magnetic retentivity characteristics, is placed in cylinder 31 and subjected to the polarization field $H_p$, any magnetizable materials within the unknown material will become polarized and magnetized to produce a separate magnetic field having flux paths indicated by the dotted lines shown in FIG. 3. This field will add to and subtract from the earth's magnetic field to produce a resultant precessional field of inhomogeneous character around and through the test holder 28 so that the resultant precessional field acting on the protons of the materials within the annulus 29 will be inhomogeneous, that is, not uniform for all precessing protons in the annulus 29. The resulting effect is that the duration of inphase precession, accounting for the length of the relaxation waveform of FIG. 7, will be shortened because of the out-of-phasing of the precessing protons. The effect of the sample within cylinder 31 on the relaxation signal may be as is illustrated in the lower portion of FIG. 7 where the relaxation signal may be both of shorter duration and oscillatory in envelope. To those skilled in the art, the comparison of the two relaxation curves of FIG. 7 provides an accurate quantitative and qualitative measure of the magnetic properties of the unknown sample material and the effect the material will have on the precession of protons in a known material. By such a comparison measurement, for the purposes of well logging wherein the sample within holder 31 may be the poisoned drilling mud, subsequent nuclear magnetic relaxation measurements may be performed with a knowledge of the magnetic properties of the mud, or the drilling mud may be further modified with added materials to establish desired magnetic properties.

Figure 5:
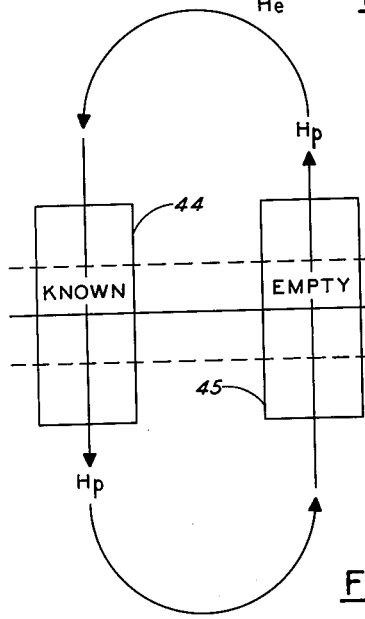
FIGS. 5 and 6 are cross-sectional views through the test portion of the apparatus of FIG. 4 illustrating schematically the paths of the magnetic forces employed in the performance of the present invention.
Figure 6:
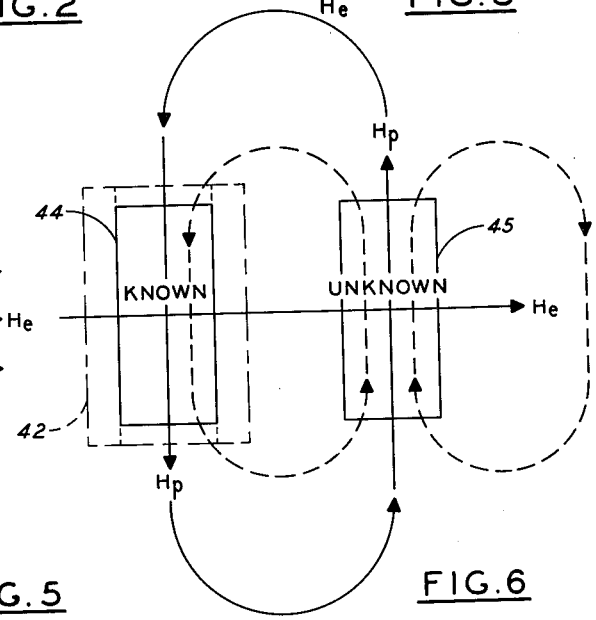

FIGS. 5 and 6 illustrate the field paths encountered in the operation of the apparatus as illustrated in FIG. 4 wherein FIG. 5 illustrates the precessional field as $H_e$ when no material is enclosed within the sample holder 45 and a known material, as, for instance, water, having the characteristics described with respect to FIG. 3, is enclosed within the sample holder 44. It should be noted that the polarization fields in the two sample holders 44 and 45 are in opposite directions in accordance with energization of the solenoids 42 and 43 so that, with duplicate construction for the two solenoids, both sample holders may be subjected to a polarization field of the same strength.

When a sample of unknown material is added to the holder 45 as illustrated in FIG. 6, the material will become polarized and magnetized to establish a magnetic flux path as shown in dotted lines in the figure. This magnetic field will add to and subtract from the earth's magnetic field to produce a resultant inhomogeneous precessional field acting upon the sample within the holder 44. The effect upon the nuclear magnetic relaxation signal under the two conditions shown in FIGS. 5 and 6 will be as had been described with respect to FIGS. 2 and 3 and as illustrated in FIG. 7. The relaxation waveform at the upper portion of FIG. 7 indicates a relaxation signal A with holder 45 empty, as shown in FIG. 5, while the lower relaxation waveform of FIG. 7 indicates a relaxation signal B as may be derived when an unknown material, or a mud sample, is inserted into the test holder 45, as shown in FIG. 6.

The apparatus of FIG. 4 may also be supported on a rotatable shaft as is the chassis of FIG. 1 to provide alignment with the vertical component of the earth's magnetic field; however, with the alignment of the chassis 41 with the earth's magnetic field as shown in FIG. 4, the samples in coils 42 and 43 are both polarized in directions perpendicular to the earth's magnetic field. The field lines from the magnetized sample in one coil does, however, at some points add to and at other points subtract from the earth's field. Although the arrangement is somewhat different from that of FIG. 1, the resultant inhomogeneous field will produce the signal pattern similar to that of the lower part of FIG. 7 and will be a measure of the magnetization of the magnetized sample in the one coil.

While certain preferred embodiments of the invention have been specifically disclosed, it is understood that the invention is not limited thereto, as many variations will be readily apparent to those skilled in the art, and the invention is to be given its broadest possible interpretation within the terms of the following claims.

I claim:

1. Apparatus for testing certain magnetic characteristics of a sample of unknown material comprising a frame including a pair of legs, a shaft rotatably supported in said legs, and a nuclear magnetism test apparatus supported on said shaft, said test apparatus including a hollow cylinder-like annulus having an annular cross-section for containing a test material having a known nuclear magnetic precessional signal in a known uniform precessional field, a measured quantity of said unknown material uniformly suspended within the interior perimeter of said hollow portion of said annulus, means for creating a substantially uniform magnetic field through said annulus to polarize atomic particles within said test material and to magnetize said unknown material, and means for measuring the nuclear magnetic precessional signal of said nuclear particles in said test material in the resultant field of said known uniform precession field and any magnetic field produced by said unknown material, whereby said certain magnetic characteristics of said unknown material may be determined by the existence of changes in the nuclear magnetic precessional signals derived of said test sample.

2. The apparatus of claim 1 wherein said known precessional field is the earth's magnetic field and said cylinder-like annulus is fixed to an adjustably positionable chassis for alignment of said cylinder-like annulus with respect to the vertical component of the earth's magnetic field.

3. Apparatus for testing certain magnetic characteristics of a sample of unknown material comprising a frame including a pair of legs, a shaft rotatably supported in said legs, and a nuclear magnetism test apparatus supported on said shaft, said test apparatus including a pair of parallel hollow solenoid coils of identical construction, adapted to be initially aligned in a known uniform magnetic field, said coils being positioned contiguous to each other, sample holding means within each of said coils, a sample of a test material having a known nuclear magnetic precessional signal in said known uniform magnetic field in the holding means within the first of said coils, a measured quantity of said unknown material uniformly suspended in the holding means within the other of said coils, circuit means serially connecting said coils, means for passing an electrical current through said first and other coils whereby the magnetic field of said first coil polarizes nuclear particles within said test material in said first coil and the magnetic field of said other coil magnetizes magnetic materials within said other coil, the magnetic field of said magnetized magnetic materials encompassing said first coil and its sample holding means, and means for measuring the nuclear magnetism precessional signal of said test material in the resultant precessional field of said known uniform magnetic field and the magnetic field produced by said magnetized unknown material, whereby said certain magnetic characteristics of said unknown material may be determined by the change in nuclear magnetism precessional signal of said test sample with said unknown material within said other of said coils.

4. The apparatus of claim 3 wherein the known uniform magnetic field is the earth's magnetic field and said pair of solenoid coils are fixed to an adjustably positionable chassis for alignment of said solenoids with respect to the vertical component of the earth's magnetic field.

5. The method for determining the effect of magnetic poisoning of a drilling mud used in drilling a well bore through an earth formation comprising the steps of magnetically polarizing nuclear particles within a sample of test material having a measurable nuclear magnetism free precessional signal, detecting the nuclear magnetism free precessional signal from said test material, positioning a measured quantity of said drilling mud in proximity with said test material, magnetically polarizing said test material a second time and, with the same polarizing field, magnetizing magnetic materials within said measured quantity of drilling mud, detecting a second nuclear magnetism free precessional signal from said test material, comparing said first and second detected precessional signals as a measure of the effect of the proximity of said drilling mud to said test material, and relating said detected proximity effect to the proximity of said drilling mud to precessing nuclear particles within an earth formation.

6. The method of determining the effect of magnetization of magnetizable materials present in a drilling mud used in penetrating a well bore through an earth formation upon in situ nuclear magnetism free precessional signals measured from within said well bore, the effect being determined at the earth's surface prior to said in situ measurements, comprising the steps of performing a first nuclear magnetism free precessional signal measurement on a sample of test material at the earth's surface, detecting said nuclear magnetism free precessional signal, positioning a measured quantity of said drilling mud in proximity with said test material, performing a second nuclear magnetism free precessional signal measurement on said test material including subjecting said drilling mud to the same magnetic field employed in polarizing said test sample, detecting a second nuclear magnetism free precessional signal from said test material, comparing said first and second signals as a measure of the effect of retained magnetization in magnetizable materials present in said drilling mud and relating said proximity at the earth's surface to the effect to be exerted upon freely precessing nuclear particles within said earth formation with said drilling mud present within said well bore.

7. The method for determining the effect of the presence of magnetizable materials within material of unknown magnetic characteristics upon the signals of free nuclear precession to be detected within on earth formation penetrated by a well bore comprising the steps of locating a sample of test material having known nuclear magnetism characteristics in an established position with respect to a precessional field of uniform magnetic strength, performing a first nuclear magnetic free precession measurement upon said test material, measuring the nuclear magnetism free precessional signal of said test material in said uniform precessional field, positioning a measured quantity of said unknown material in proximity with said test material, performing a second nuclear magnetic free precession measurement wherein magnetic retentive materials in said unknown material are subjected to the same polarizing field as said test material, again measuring the nuclear magnetism free precessional signal in said test material with said magnetic retentive materials in said unknown material contributing to the precessional field for said test material, comparing said first and second measured nuclear magnetism free precessional signals to detect the presence of magnetizable materials within said material of unknown characteristics, and projecting the effect of said detected presence of magnetizable materials to the effects of proximity of said material of unknown magnetic characteristics with precessing nuclear particles within said earth formation penetrated by said well bore.

8. Apparatus for determining the effect of the proximity of a material of unknown magnetic characteristic upon a sample of material having known nuclear magnetism characteristics in a predetermined precessional magnetic field comprising a frame having a base portion and two upstanding legs fixed to said base portion at opposite sides thereof, a shaft rotatably supported in said upstanding legs at the ends thereof away from said base portion, a nuclear magnetism free precessional signal detecting means supported on said rotatable shaft, means in said test apparatus for independently supporting at least two separate test samples including means for removing at least one of said test samples from said apparatus, and means on one of said upstanding legs for rotating said shaft and said test apparatus therewith.

9. Apparatus for determining the effect of the proximity of a material of unknown magnetic characteristic upon a sample of material having known nuclear magnetism characteristics in a predetermined precessional magnetic field comprising a frame having a base portion and two upstanding legs fixed to said base portion at opposite sides thereof, a shaft rotatably supported in said upstanding legs at the ends thereof away from said base portion, a nuclear magnetism free precessional signal detecting means supported on said rotatable shaft, means on one of said upstanding legs for rotating said shaft and said test apparatus therewith, and means in said test apparatus for independently supporting at least two separate test samples including means for removing at least one of said test samples from said apparatus, means on said means for rotating said shaft for indicating the alignment of said test apparatus with the earth's magnetic field and means for energizing said test apparatus for detecting nuclear magnetism free precessional signals.

References Cited in the file of this patent
UNITED STATES PATENTS 2,878,444    Feher _____ Mar. 17, 1959

FOREIGN PATENTS 1,015,954    Germany _____ Sept. 19, 1957

OTHER REFERENCES

Broersma—Journal of Chemical Physics—Vol. 24, No. 1, January 1956—pp. 153-160.

Gracia et al.—Journal of Physical Chemistry—Vol. 60, No. 11, November, 1956—pp. 1594 to 1596.